May 23, 1944.  F. W. MOXEY  2,349,670
COMBINATION COMPASS AND MEASURING INSTRUMENT
Filed June 29, 1942  2 Sheets-Sheet 1
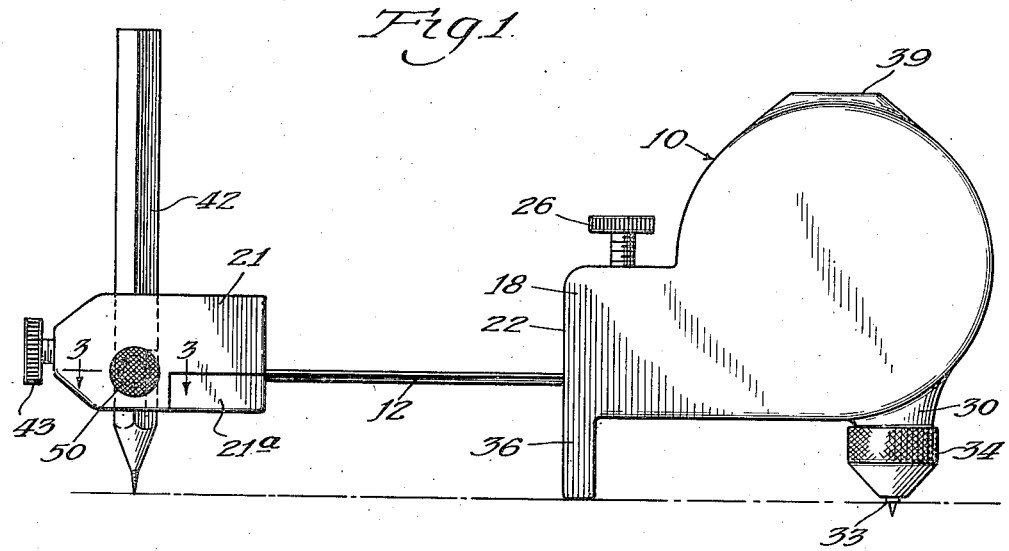
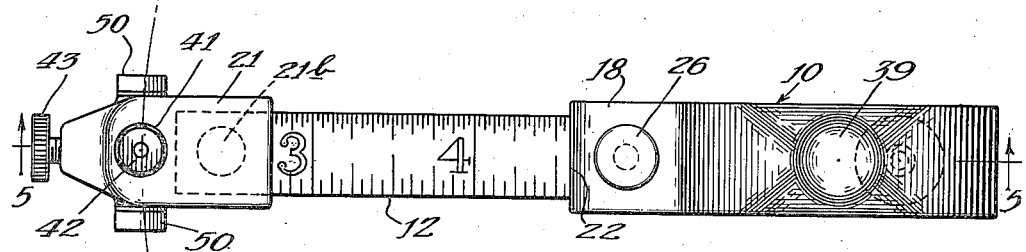
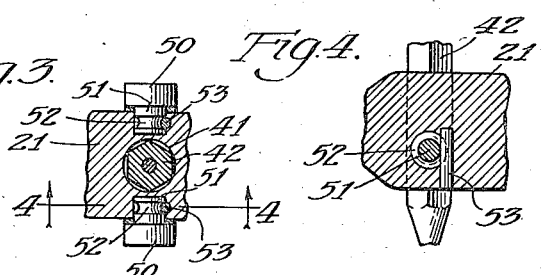
Inventor:
Fred W. Moxey,
By Bair & Freeman
Attorneys May 23, 1944.    F. W. MOXEY    2,349,670
COMBINATION COMPASS AND MEASURING INSTRUMENT
Filed June 29, 1942    2 Sheets-Sheet 2
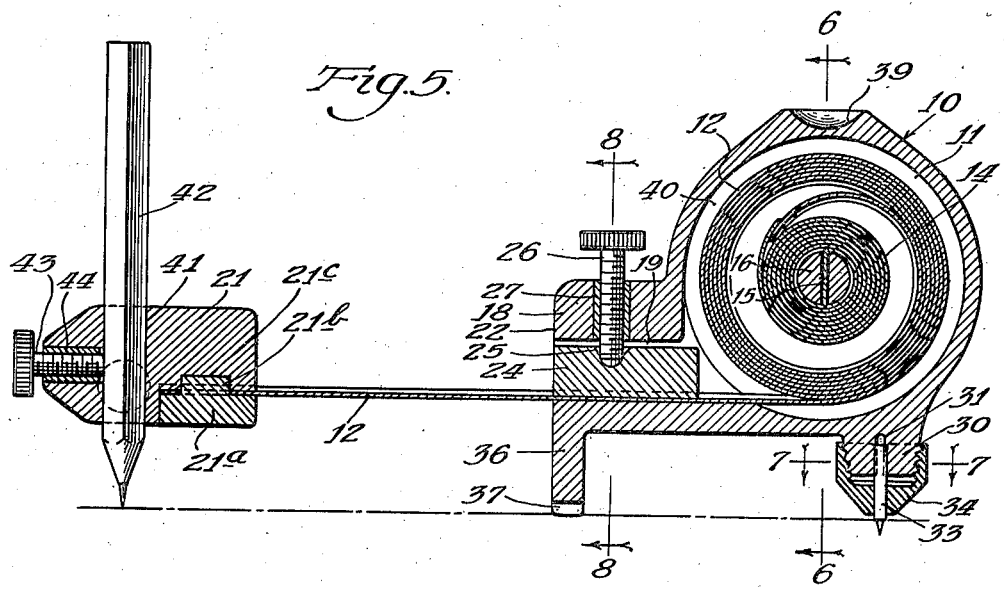
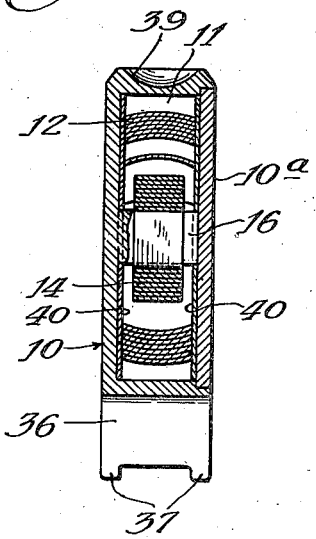
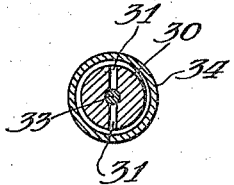
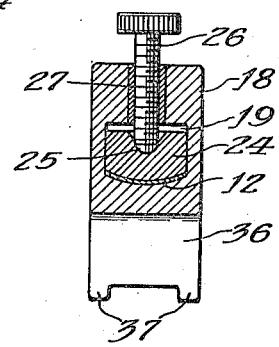
Inventor:
Fred W. Moxey,
By: Bair & Freeman
Attorneys Patented May 23, 1944

2,349,670

UNITED STATES PATENT OFFICE 2,349,670

COMBINATION COMPASS AND MEASURING INSTRUMENT

Fred W. Moxey, Aurora, Ill., assignor to American Molded Products Co., Chicago, Ill., a corporation of Illinois Application June 29, 1942, Serial No. 449,005

9 Claims. (Cl. 33—27)

This invention relates to a compass construction of the type adapted for use in describing an arc, or a circle, and is constructed so as to define an arc or circle of a relatively large range of radii, up to and including several feet. Heretofore, specially devised compass constructions have been employed in various arts, such as a drafting, layout, wood-working, carpentry, machine shop work, and sheet metal work, etc. The compass arrangements heretofore employed in certain arts, especially when working at a radius of several feet, are, in the main, awkward to use, comparatively expensive, and are often relatively inaccurate. For example, in drafting and in layout work, "beam" compasses are used, and usually include several rigid beams of metal or wood of different lengths, with a view to affording some range of convenience in use. In carpentry work the usual practice is to use a nail, fixed in a board, as a pivot, to which one end of a cord is tied, the other end of the cord being connected to a pencil or nail to serve as a marker. In machine shop work and in sheet metal work often a relatively large pair of dividers are employed for describing an arc. Such instruments are rather bulky and awkward to handle and do not afford convenience in use.

One of the objects of this invention is to provide an improved compass of the character indicated, which is convenient for use in various arts or fields for accurately defining an arc or a circle of a relatively wide range of radii, up to and including several feet, and which is capable, when not in use, to be compacted into a relatively small space.

Another object is to provide a novel compass construction wherein a pivot point and a marker means are connected by a graduated measuring member, and wherein the pivot point and marker means are readily adjustable toward and away from each other to a position for defining an arc or circle of a predetermined radius.

A further object is to provide an improved compass construction in which a pivot point and a marker means are adjustable relatively to each other by a connection to a graduated tape which is adapted to be coiled in a housing, and wherein said housing serves as a mounting for the pivot pin.

Still another object is to provide an improved and simplified compass construction of the character indicated, which is relatively inexpensive to manufacture, and which may be readily adapted for use in various arts or fields.

A still further object is to provide an improved instrument of the character indicated in which the pivot point and marker means are adjustable relatively to each other by connection to a graduated measuring element so as to permit use of the instrument for making lineal measurements.

Other objects and advantages of this invention will be apparent from the following description, taken in connection with the accompanying drawings in which:

Figure 1 is a view in side elevation of the novel combination compass and measuring instrument, embodying the present invention;

Figure 2 is a top or elevational view thereof;

Figure 3 is a transverse sectional view through the head carrying the marker means, taken as indicated at line 3—3 on Figure 1;

Figure 4 is a fragmentary vertical section through the head taken as indicated at line 4—4 on Figure 3, showing the manner of connection of the finger grips associated with the head;

Figure 5 is a vertical section through the instrument, taken as indicated at line 5—5 on Figure 2;

Figure 6 is a vertical section through the housing containing a coiled, graduated measuring tape, taken substantially as indicated at line 6—6 on Figure 5;

Figure 7 is a transverse sectional view through the chuck for the pivot point, taken as indicated at line 7—7 on Figure 5; and Figure 8 is a vertical section through the tape clamping means at the forward portion of the housing, taken as indicated at line 8—8 on Figure 5.

The combination compass and measuring instrument embodying the present invention, as illustrated in the drawings, includes a housing 10 formed with a substantially cylindrical cavity 11 in which is adapted to be coiled a flexible graduated tape 12, which is preferably formed of metal. The inner end coil of tape is connected in any suitable manner to the outer end portion of a spring 14, the inner end of which spring is anchored in a slot 15 of a centrally located stud 16, formed integrally with a portion of the housing 10. It is to be understood that the tape 12 may be of any desired, practical length, and any suitable arrangement or connection of the tape to the spring may be employed such as embodied in present commercial constructions of measuring tapes.

As is well known, measuring tapes, when made of metal, are preferably formed so that in cross-section they are of generally concavo-convex formation, as seen in Figure 8 of the drawings. The purpose of such formation is to insure adequate rigidity of the tape when in extended position, while allowing adequate flexibility for coiling and uncoiling, and to assist in nesting of the convolutions of the tape in coiled formation.

The housing 10 includes an offset portion 18 formed with an opening 19 through which the tape 12 is fed into and out of the cavity of the housing 10. The free end of the tape 12 is rigidly connected to a head 21. Normally, the head 21, in collapsed condition of the instrument, abuts against the vertical face 22 of the projection 18 of the housing 10, as will hereinafter be referred to. Said face 22 also constitutes the index feature with which the graduations of the measuring tape 12 are adapted to be aligned, in making proper adjustment of the instrument for use as a compass, or in using the instrument for making lineal measurements.

The tape 12 may be firmly clamped at any desired position of extended adjustment, and for this purpose the bottom of the opening 19, in the projection portion 18 of said housing, is formed to the contour of the under side of the tape, as seen in Figure 8 of the drawings. Adapted to be seated upon the upper surface of the tape, is a follower block 24, disposed in said opening 19. The lower surface of said follower block is shaped to the contour of the tape, and the upper surface of said follower block is provided with a seat 25, into which extends the lower end of a headed clamping screw 26, threaded in a bushing 27, press-fitted into the top of the projecting portion 18 of said housing 10. When the head 21, together with the tape 12, are moved outwardly with respect to the housing 10, to a desired position of adjustment, the tape may be releasably locked in such position of adjustment by merely tightening the clamping screw 26, which urges the follower block 24 in a downwardly direction, to firmly embrace the tape 12 between said block and the bottom of opening 19, to hold the tape in a desired position of adjustment.

The lower rearward portion of the housing 10 is formed with a depending, tapered embossment 30, which is slotted vertically at two opposite sides, as indicated at 31, to constitute a chuck for a pivot pin 33. A chuck nut 34 is threaded on the external surface of the embossment 30, tending to squeeze the lower portions thereof tightly about the pivot pin 33 for rigidly securing it in operative position.

Extending immediately below the projecting portion 18 of the housing is a leg 36, formed with two transversely, spaced-apart feet 37, which, together with the pivot pin 33, constitute a three-point support for the housing for insuring adequate stability of the housing in use. The upper end of the housing is formed with a finger seat or depression 39, preferably located in a vertical plane, intermediate the pivot pin 33 and the supporting leg 36, so that downward pressure exerted on the housing upon finger engagement in the seat 39 tends to properly distribute the downward force for maintaining the housing in a stabilized condition for use.

For simplicity and economy in manufacture, the housing 10, together with the follower block 24 and the head 21, are preferably formed of suitable plastic material, and, as seen in Figure 6 of the drawings, the housing 10 is formed with a removable side wall 10a having a recessed fit in the main body portion of the housing, so as to permit convenient mounting therein of the graduated tape 12 and the coil spring 14, which tape and spring are coiled between metal discs 40. It is to be understood that the side wall 10a is permanently secured to the remaining body portion of the housing 10 by the application of suitable solvent at the areas of abutment of the housing parts so as to, in effect, form a unitary, integral housing.

The head 21 is formed with an auxiliary piece 21a, so dimensioned with respect to the main portion of the head 21 as to provide a cavity for receiving the outer end of the tape 12, as may be seen in Figures 2 and 5 of the drawings. The auxiliary head member 21a is formed with an upwardly extending boss 21b, adapted to be projected through an aperture formed in the free end of the tape, and snugly seated in a cooperatively formed cavity 21c formed in the main head element 21. It is to be understood that the auxiliary head member 21a is secured to the main head 21 by the application of suitable solvent to the contacting areas of the two elements to permanently connect the parts together.

Said head 21 is formed with a vertically disposed socket 41 in which is adapted to be telescoped a suitable form of marker means, and herein shown as a pencil, indicated at 42. The pencil is firmly held in fixed relation with respect to the head 21 by a headed, threaded screw 43, having threaded engagement in a bushing 44, press-fitted into the outer end of the head 21, as seen in Figure 5 of the drawings, with the end of the screw 43 impinging directly against the pencil 42. It is to be understood that any other suitable form of marker means may be employed, depending upon the nature of use of the instrument. For example, a suitable form of scribe may be substituted for the pencil for use in connection with metal work. It is also to be understood that various types of pivot pins, other than that shown, may be employed, depending upon the nature of use of the instrument. For drafting, a suitable ruling pen may be substituted for the pencil. In making pencil drawings, the same pencil, used mainly in making the drawing, may be used in the head 21, so that the entire drawing will be of the same general appearance and accuracy.

As may be seen in the drawings, the outer end of the tape 12 is connected to the head 21 in such a relation that the graduations of the tape, when in alignment with the index feature 22, indicates the actual distance between the center line of the marker means 42 and the axis of the pivot pin 33. It will therefore be apparent that in the collapsed or compacted condition of the instrument the inner end of the head 21 will abut against the face or index feature 22 of the projection portion 18 of the housing, and the distance between the pencil point and the pivot pin, in such condition of the instrument, as represented in the illustrated embodiment of the invention, is two and three-quarters inches. This dimension, however, will always depend upon the distance between the index face 22 and the axis of the pivot pin, together with the distance from the inner end of the head 21 to the axis of the marker means.

In the use of the instrument, the preferred kind of pivot point and marker means should first be secured in position. The head 21 is then pulled outwardly with respect to the housing until the graduations of the tape, in alignment with the index feature 22, corresponds to the actual radius for which it is sought to describe an arc or circle. The clamping screw 26 is then firmly tightened to rigidly secure the tape 12 in such extended position. The pivot pin 33 is then seated in the surface at the desired point and pressure exerted by the finger in the seat 39 to stabilize the housing in upright position. The head 21 is then swung laterally about the axis of the pivot pin 33, and the housing 10, also rotating therewith, so that the marker means describes the arc or circle of the predetermined radius.

It has been found from actual experience that in using a metal tape there may be a tendency in the movement of the head in the process of describing of the arc or circle, to twist the hand or the fingers holding the head so as to tend to buckle the tape, either upwardly or downwardly, a slight amount, which will result in a slight inaccuracy of the arc defined by the marker means To eliminate this difficulty I have provided a pair of finger grips 50 at opposite sides of the head 21. These finger grips are preferably in the form of buttons swivelly mounted in the head, about a horizontal axis, and each include inwardly extending shanks 51, each provided with an annular groove 52. The shank portion of each of the finger grips is secured in place in the head 21 by a press-fitted pin 43, driven upwardly through the bottom of the head into registration with the annular groove 52, as clearly seen in Figures 3 and 4 of the drawings. By virtue of this arrangement the finger grips are free to rotate their transverse horizontal axis. The outer faces of the finger grips are preferably roughened or knurled so that, when engaged by the finger, there will be a tendency for the buttons to rotate relatively to the head, to accommodate the movement of the fingers or hand in the process of defining an arc or circle. In order that the swivel finger grips serve their intended purpose and eliminate the above mentioned difficulty, it is essential that said finger grips be located with their axis disposed substantially in alignment with the center of the marker means, and also located substantially centrally with respect to the edge elevation of the tape 12, as seen in the drawings.

While I have shown and described a preferred embodiment of my invention, manifestly it is capable of modification and rearrangement of parts and of the method without departing from the spirit and scope thereof. I do not, therefore, wish to be understood as limiting my invention to the precise form herein disclosed, except as I may be so limited by the appended claims.

I claim as my invention:

1. In a device of the character described, including a housing, a graduated measuring tape coiled in said housing, said housing being provided with an opening through which said tape is fed into and out of the housing, means associated with said housing, adjacent said opening, for releasably securing said tape at a desired position of extended adjustment, a head secured to the free end of said tape and formed for supporting a marker means, and a pivot pin carried by the lower portion of the housing and adapted to be seated in a surface, whereby said housing, tape and head may be moved as a unit about the axis of said pivot pin to permit said marker means to describe an arc on said surface; the improvement characterized by the provision of a leg extending downwardly from the bottom of the housing, in spaced relation to the pivot pin, and adapted to be seated for sliding engagement on said surface and serving to assist in stabilizing said housing in upright position when the pivot pin is seated in said surface.

2. In a device of the character described including a housing, a graduated measuring tape coiled in said housing, said housing being provided with an opening through which said tape is fed into and out of the housing, means associated with said housing, adjacent said opening, for releasably securing said tape at a desired position of extended adjustment, a head secured to the free end of said tape and formed for supporting a marker means, and a pivot pin carried by the lower portion of the housing and adapted to be seated in a surface, whereby said housing, tape and head may be moved as a unit about the axis of said pivot pin to permit said marker means to describe an arc on said surface; the improvement characterized by the provision of a leg extending downwardly from the bottom of the housing, in spaced relation to the pivot pin, said leg terminating at its lower end in a pair of transversely spaced apart feet adapted to be seated in sliding engagement with said surface, which, together with said pivot pin, constitute a three point support for the housing in upright position when said pin is seated in said surface.

3. In a device of the character described including a housing, a graduated measuring tape coiled in said housing, said housing being provided with an opening through which said tape is fed into and out of the housing, means associated with said housing, adjacent said opening, for releasably securing said tape at a desired position of extended adjustment, a head secured to the free end of said tape and formed for supporting a marker means, and a pivot pin carried by the lower portion of the housing and adapted to be seated in a surface, whereby said housing, tape and head may be moved as a unit about the axis of said pivot pin to permit said marker means to describe an arc on said surface; the improvements characterized by the provision of a leg extending downwardly from the bottom of the housing, in spaced relation to the pivot pin, said leg terminating at its lower end in a pair of transversely spaced apart feet adapted to be slidably seated on said surface, which, together with said pivot pin, constitute a three point support for the housing in upright position when said pin is seated in said surface, the upper end of said housing being formed with a depressed finger seat for assisting in stabilizing said housing on its three point support, during movement thereof about the axis of said pivot pin.

4. In a device of the character described including a housing, a graduated measuring tape coiled in said housing, said housing being provided with an opening through which said tape is fed into and out of the housing, means associated with said housing, adjacent said opening, for releasably securing said tape at a desired position of extended adjustment, a head secured to the free end of said tape and formed for supporting a marker means, and a pivot pin carried by the lower portion of the housing and adapted to be seated in a surface, whereby said housing, tape and head may be moved as a unit about the axis of said pivot pin to permit said marker means to describe an arc on said surface; the improvements characterized by the provision of a leg extending downwardly from the bottom of the housing, in spaced relation to the pivot pin, said leg terminating at its lower end in a pair of transversely spaced apart feet adapted to be slidably seated on said surface, which, together with said pivot pin, constitute a three point support for the housing in upright position when said pin is seated in said surface, the upper end of said housing being formed with a depressed finger seat located in horizontal direction, between the axis of the pivot pin and said leg, for assisting in stabilizing said housing on its three point support, during movement thereof about the axis of said pivot pin.

5. In a device of the character described including a housing, a graduated measuring tape coiled in said housing, said housing being provided with an opening through which said tape is fed into and out of the housing, means associated with said housing, adjacent said opening, for releasably securing said tape at a desired position of extended adjustment, a head secured to the free end of said tape and formed for supporting a marker means, and a pivot pin carried by the lower portion of the housing and adapted to be seated in a surface, whereby said housing, tape and head may be moved as a unit about the axis of said pivot pin to permit said marker means to describe an arc on said surface; the improvement characterized by the provision of portions at opposite sides of said head, disposed in alignment with the tape, and having a configuration different than other adjacent portions of said sides of the head to constitute finger grips.

6. In a device of the character described including a housing, a graduated measuring tape coiled in said housing, said housing being provided with an opening through which said tape is fed into and out of the housing, means associated with said housing, adjacent said opening, for releasably securing said tape at a desired position of extended adjustment, a head secured to the free end of said tape and formed with a socket for receiving a marker means, and a pivot pin carried by the lower portion of the housing, and adapted to be seated in a surface, whereby said housing, tape and head may be moved as a unit about the axis of said pivot pin to permit said marker means to describe an arc on said surface; the improvement characterized by the provision of portions at opposite sides of said head, disposed in alignment with the axis of the socket for the marker means, and having a configuration different than adjacent portions of the said sides of the head to constitute finger grips.

7. In a device of the character described including a housing, a graduated measuring tape coiled in said housing, said housing being provided with an opening through which said tape is fed into and out of the housing, means associated with said housing, adjacent said opening, for releasably securing said tape at a desired position of extended adjustment, a head secured to the free end of said tape and formed with a socket for receiving a marker means, and a pivot pin carried by the lower portion of the housing and adapted to be seated in a surface, whereby said housing, tape and head may be moved as a unit about the axis of said pivot pin to permit said marker means to describe an arc on said surface; the improvement characterized by the provision of a pair of finger grips swivelly mounted in said head about a transverse axis and extending laterally from opposite sides of said head.

8. In a device of the character described including a housing, a graduated measuring tape coiled in said housing, said housing being provided with an opening through which said tape is fed into and out of the housing, means associated with said housing, adjacent said opening, for releasably securing said tape at a desired position of extended adjustment, a head secured to the free end of said tape and formed with a socket for receiving a marker means, and a pivot pin carried by the lower portion of the housing and adapted to be seated in a surface, whereby said housing, tape and head may be moved as a unit about the axis of the pivot pin to permit said marker means to describe an arc on said surface; the improvement characterized by the provision of a pair of finger grips swivelly mounted in said head about a transverse axis in central alignment with the axis of said socket and in substantially the horizontal plane of the tape and extending laterally from opposite sides of said head.

9. In a device of the character described including a housing, a graduated measuring tape coiled in said housing, said housing being provided with an opening through which said tape is fed into and out of the housing, means associated with said housing, adjacent said opening, for releasably securing said tape at a desired position of extended adjustment, a head secured to the free end of said tape and formed with a socket for receiving a marker means, and a pivot pin carried by the lower portion of the housing and adapted to be seated in a surface, whereby said housing, tape and head may be moved as a unit about the axis of said pivot pin to permit said marker means to describe an arc on said surface; the improvements characterized by the provision of a pair of finger grips swivelly mounted in said head about a transverse axis and extending laterally from opposite sides of said head, and a leg extending downwardly from the bottom of the housing, in spaced relation to the pivot pin, and adapted to be slidably seated upon said surface for assisting in stabilizing the housing in upright position when the pivot pin is seated in said surface.

FRED W. MOXEY.